United States Patent
Van Cleve

(10) Patent No.: US 7,287,438 B2
(45) Date of Patent: Oct. 30, 2007

(54) METHOD AND APPARATUS FOR FORCE BALANCING OF A CORIOLIS FLOW METER

(75) Inventor: Craig Brainerd Van Cleve, Lyons, CO (US)

(73) Assignee: Micro Motion, Inc., Boulder, CO (US)

( * ) Notice: Subject to any disclaimer, the term of this patent is extended or adjusted under 35 U.S.C. 154(b) by 29 days.

(21) Appl. No.: 10/552,528

(22) PCT Filed: Apr. 17, 2003

(86) PCT No.: PCT/US03/11959

§ 371 (c)(1),
(2), (4) Date: Oct. 11, 2005

(87) PCT Pub. No.: WO2004/099735

PCT Pub. Date: Nov. 18, 2004

(65) Prior Publication Data

US 2006/0207346 A1    Sep. 21, 2006

(51) Int. Cl.
*G01F 1/84* (2006.01)
(52) U.S. Cl. ................................. 73/861.355
(58) Field of Classification Search ............. None
See application file for complete search history.

(56) References Cited

U.S. PATENT DOCUMENTS

| | | | |
|---|---|---|---|
| 4,756,198 A | 7/1988 | Levien | |
| 5,398,554 A * | 3/1995 | Ogawa et al. | 73/861.357 |
| 5,979,246 A * | 11/1999 | Van Cleve et al. | 73/861.357 |
| 6,070,474 A * | 6/2000 | van der Pol et al. | 73/861.357 |
| 6,336,369 B1 * | 1/2002 | Gomi et al. | 73/861.357 |
| 6,397,685 B1 | 6/2002 | Cook et al. | |
| 6,439,060 B1 | 8/2002 | Cage | |
| 6,487,917 B1 * | 12/2002 | Van Cleve et al. | 73/861.357 |
| 6,598,489 B1 * | 7/2003 | Van Cleve et al. | 73/861.357 |
| 6,883,387 B2 | 4/2005 | Bitto et al. | |

FOREIGN PATENT DOCUMENTS

| | | |
|---|---|---|
| EP | 0905488 A2 | 3/1999 |
| EP | 1248084 A | 10/2002 |
| GB | 2314930 A | 1/1998 |
| RU | 2107263 C1 | 3/1998 |

* cited by examiner

*Primary Examiner*—Harshad Patel
(74) *Attorney, Agent, or Firm*—The Ollila Law GRoup LLC

(57) ABSTRACT

A Coriolis flow meter comprising at least one flow conduit, a drive system coupled to the at least one flow conduit, a balance system coupled to the at least one flow conduit wherein the balance system is sized and located such that the momentum of the balance system is equal and opposite to the momentum of the drive system.

18 Claims, 5 Drawing Sheets

METHOD AND APPARATUS FOR FORCE BALANCING OF A CORIOLIS FLOW METER

BACKGROUND OF THE INVENTION

1. Field of the Invention

The present invention relates to force balancing of a Coriolis flow meter.

2. Statement of the Problem

Vibrating conduit sensors, such as Coriolis mass flow meters, typically operate by detecting motion of a vibrating conduit that contains a material. Properties associated with the material in the conduit, such as mass flow, density and the like, in the conduit may be determined by processing signals from motion transducers associated with the conduit, as the vibration modes of the vibrating material-filled system generally are affected by the combined mass, stiffness and damping characteristics of the containing conduit and the material contained therein.

A typical Coriolis mass flow meter includes one or more conduits that are connected inline in a pipeline or other transport system and convey material, e.g., fluids, slurries and the like, in the system. Each conduit may be viewed as having a set of natural vibration modes including, for example, simple bending, torsional, radial and coupled modes. In a typical Coriolis mass flow measurement application, a conduit is excited in one or more vibration modes as a material flows through the conduit, and motion of the conduit is measured at points spaced along the conduit. Excitation is typically provided by an actuator, e.g., an electromechanical device, such as a voice coil-type driver, that perturbs the conduit in a periodic fashion. Mass flow rate may be determined by measuring time delay or phase differences between motion at the transducer locations.

The magnitude of the time delay is very small; often measured in nanoseconds. Therefore, it is necessary to have the transducer output be very accurate. Transducer accuracy may be compromised by nonlinearities and asymmetries in the meter structure or from motion arising from extraneous forces. For example, A Coriolis mass flow meter having unbalanced components can vibrate its case, flanges and the pipeline at the drive frequency of the meter. This vibration perturbs the time delay signal in an amount that depends on the rigidity of the mount. Since the rigidity of the mount is generally unknown and can change over time and temperature, the effects of the unbalanced components cannot be compensated and may significantly affect meter performance. The effects of these unbalanced vibrations and mounting variations are reduced by using flow meter designs that are balanced and by using signal processing techniques to compensate for unwanted components of motion.

The balanced vibration discussed above involves only a single direction of vibration: the Z-direction. The Z-direction is the direction that the conduits are displaced as they vibrate. Other directions, including the X-direction along the pipeline and the Y-direction perpendicular to the Z and X-directions, are not balanced. This reference coordinate system is important because Coriolis flow meters produce a secondary sinusoidal force in the Y-direction. This force creates a meter vibration in the Y-direction that is not balanced, resulting in meter error.

One source of this secondary force is the location of the mass of the meter driver assembly. A typical driver assembly consists of a magnet fastened to one conduit and a coil of conductive wire fastened to another conduit. The Y-vibration is caused by the center of mass of the driver magnet and the center of mass of the driver coil not lying on the respective X-Y planes of the centerline(s) of the flow conduit(s). The X-Y planes are necessarily spaced apart to keep the conduits from interfering with one another. The centers of mass of the magnet and/or coil are offset from their planes because the coil needs to be concentric with the end of magnet to be at the optimum position in the magnetic field.

A flow conduit, when driven to vibrate, does not truly translate but rather cyclically bends about the locations at which it is fixed. This bending can be approximated by rotation about the fixed point(s). The vibration is then seen to be a cyclic rotation through a small angle about its center of rotation, CR. The angular vibration amplitude is determined from the desired vibration amplitude in the Z direction and the distance, d, from the center of rotation of the conduit center at the driver location. The angular amplitude of vibration, $\Delta\theta$, is determined from the following relation:

$$\Delta\theta = \arctan(\Delta Z/d) \tag{1}$$

The offset of the driver component (magnet or coil assembly) center of mass from the conduit centerline causes the driver component center of mass to have a Y-component of its vibration. The driver component mass usually has an offset in the Z-direction that is at least equal to the conduit radius. The angular offset, $\Phi$, from the conduit centerline is thus not negligible. The driver component mass oscillates about its offset position with the same angular amplitude as the flow conduit, $\Delta\theta$. Approximating the motion of the driver mass as being perpendicular to the line connecting the driver center of mass with the center of rotation, CR, the driver mass Y-direction motion, $\Delta Y_m$, can be solved from the following:

$$\Delta Y_m = \Delta Z \sin(\phi) \tag{2}$$

The Y-direction motion of the driver component mass causes the whole meter to vibrate in the Y-direction. Conservation of momentum requires that, for a freely suspended meter, the Y-direction vibration of the entire meter is equal to the Y-direction vibration amplitude of the driver mass times the ratio of the driver mass divided by the meter mass. This Y-vibration of the entire meter is a direct result of the desired conduit vibration in Z in conjunction with the angular offset of the drive components' centers of mass. This coupling between the desired conduit vibration and the undesired Y-vibration of the entire meter means that damping of the meter Y-vibration damps the flow conduit vibration in Z, and that a stiff meter mount raises conduit frequency while a soft meter mount lowers conduit frequency. The change in conduit frequency with mounting stiffness has been observed experimentally in meters with high Y-vibration amplitude. It is a problem because conduit frequency is used to determine fluid density and frequency is also an indication of conduit stiffness. Changes in conduit stiffness due to mounting stiffness change the calibration factor of the meter. The direct coupling between the drive vibration and the local environment also results in an unstable zero (a flow signal when no flow is present) of the meter.

SUMMARY OF THE SOLUTION

The present invention helps solve the problems associated with unbalanced vibrational forces using a balance system that is sized and located so as to balance out the drive system.

Some examples of a balance system include a Y-balance mass placed on the opposite side of a flow conduit as a driver component. The balance mass is sized and located such that the combined center of mass of the driver plus the Y-balance mass lies on the X-Y plane of the conduit centerline.

In some examples, a balance device called an active-y-balance can be configured on the flow conduit(s). The active-y-balance consists of a mass connected to one end of a leaf spring with the other end attached to the flow conduit proximate the driver. Active-y-balances can be used on one or both conduits depending on the locations of the mass centers of the magnet and coil and the type of flow meter configuration (i.e. single or dual conduits).

The active-y-balance works by using the Z-direction conduit motion to move the active-y-balance mass in the Y-direction. The Y-direction momentum of the active-y-balance can be designed to balance the Y-direction momentum of the drive components and to thereby prevent case and environment shaking. By the principle of equivalence, this also makes the meter immune to environmental vibrations and damping.

Aspects

An aspect of the invention is a Coriolis flow meter comprising:
  at least one flow conduit;
  a drive system coupled to the at least one flow conduit;
  a balance system coupled to the at least one flow conduit;
wherein the balance system is sized and located such that the momentum of the balance system is equal and opposite to the momentum of the drive system.

Preferably said balance system comprises a balance mass.

Preferably said balance system is sized and located such that the combined center of mass of the drive system and the balance system lies proximate a plane of the centerline of the at least one flow conduit.

Preferably said balance system comprises a balance mass coupled to the at least one flow conduit using a leaf spring.

Preferably said leaf spring stiffness and the balance mass cause the natural frequency of the balance system to be less than the drive frequency of the flow meter.

Preferably said balance system vibrates out of phase with the at least one flow conduit.

Preferably said balance system is located on the opposite side of the at least one flow conduit from the drive component and at an orientation substantially forty-five degrees to a plane of the flow conduit.

Preferably said balance system is located on the opposite side of, the at least one flow conduit from the drive component.

Preferably said balance system is sized and located such that the momentum of the balance system is equal and opposite to the momentum of the drive system in a direction perpendicular to a drive motion. An additional aspect of the invention is a method for force balancing a Coriolis flow meter having at least one flow conduit, the method comprising the steps of:
  coupling a drive system to the at least one flow conduit;
  coupling a balance system to the at least one flow conduit; and
  locating and sizing the balance system such that the momentum of the balance system is equal and opposite to the momentum of the drive system.

Preferably said method includes the step of forming the balance system using a balance mass.

Preferably said method further comprises the steps of locating and sizing the balance system such that the combined center of mass of the drive system and the balance system lies proximate a plane of the centerline of the at least one flow conduit.

Preferably said step of coupling a balance system to at least one flow conduit comprises the steps of coupling a balance mass to at least one flow conduit using a leaf spring.

Preferably said method includes the step of choosing the leaf spring stiffness and the balance mass such that the natural frequency of the balance system is below the drive frequency of the flow meter.

Preferably said method includes the step of vibrating the balance system out of phase with the at least one flow conduit.

Preferably said step of locating the balance system comprises the steps of:
  locating the balance system on the opposite side of the at least one flow conduit from the drive system; and
  orientating the balance system substantially forty-five degrees to a plane of the flow conduit.

Preferably said method includes the step of locating the balance system on the opposite side of the at least one flow conduit from the drive system.

Preferably said step of locating and sizing the balance system comprises the steps of locating and sizing the balance system such that the momentum of the balance system is equal and opposite to the momentum of the drive system in a direction perpendicular to a drive motion.

DETAILED DESCRIPTION OF THE INVENTION

FIGS. 1-5 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
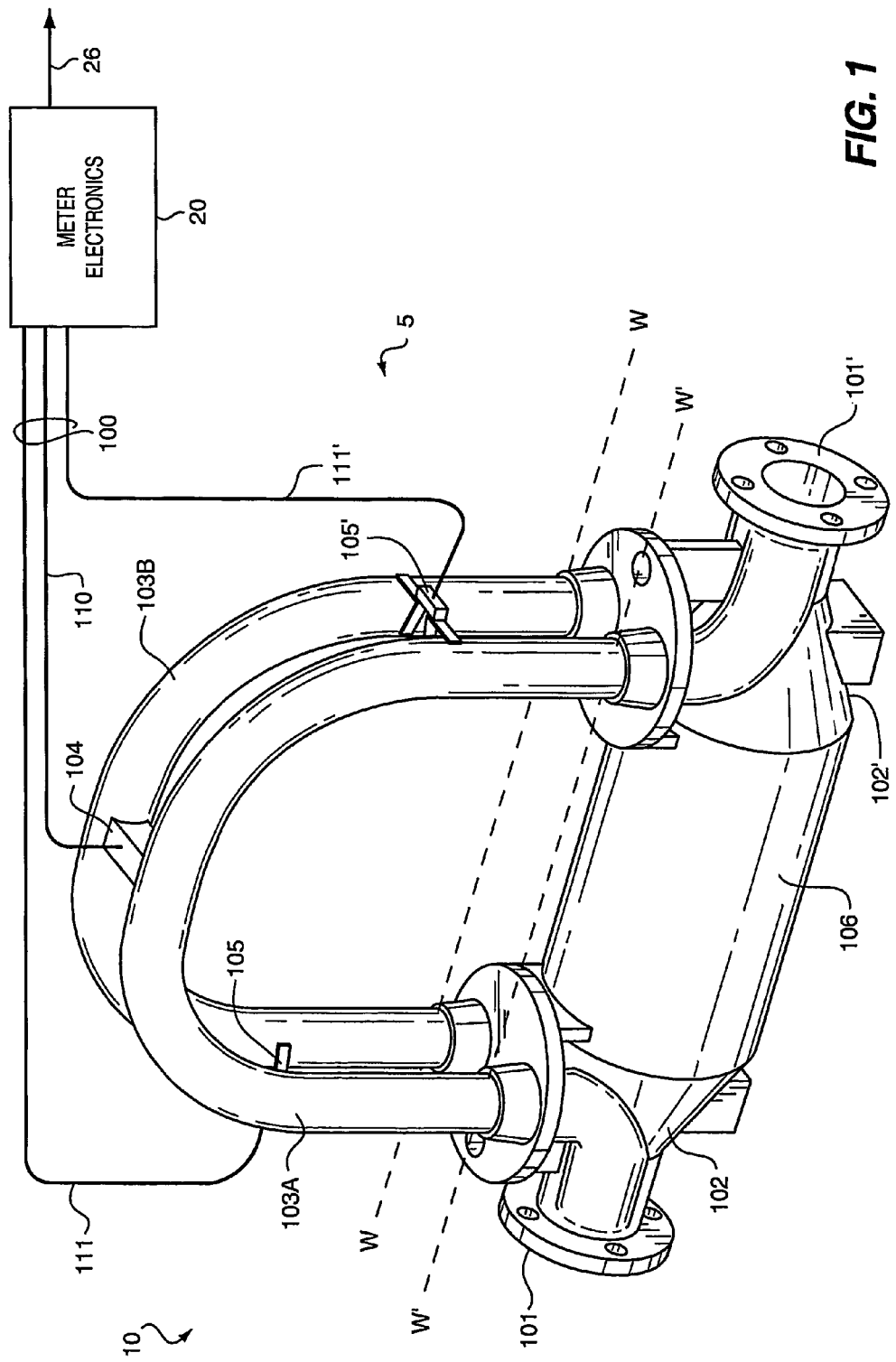
FIG. 1 illustrating a Coriolis flow meter.

FIG. 1 illustrates a Coriolis flow meter 5 comprising a flow meter assembly 10 and meter electronics 20. Meter electronics 20 is connected to meter assembly 10 via leads 100 to provide density, mass flow rate, volume flow rate, totalized mass flow, temperature, and other information over path 26. It should be apparent to those skilled in the art that the present invention can be used by any type of Coriolis flow meter regardless of the number of drivers, pick-off sensors, flow conduits or the operating mode of vibration.

Flow meter assembly 10 includes a pair of flanges 101 and 101'; manifolds 102 and 102'; driver 104; pick-off sensors 105-105'; and flow conduits 103A and 103B. Driver 104 and pick-off sensors 105 and 105' are connected to flow conduits 103A and 103B.

Flanges 101 and 101' are affixed to manifolds 102 and 102'. Manifolds 102 and 102' are affixed to opposite ends of spacer 106. Spacer 106 maintains the spacing between manifolds 102 and 102' to prevent undesired vibrations in flow conduits 103A and 103B. When flow meter assembly 10 is inserted into a pipeline system (not shown) which carries the material being measured, material enters flow meter assembly 10 through flange 101, passes through inlet manifold 102 where the total amount of material is directed to enter flow conduits 103A and 103B, flows through flow conduits 103A and 103B and back into outlet manifold 102' where it exits meter assembly 10 through flange 101'.

Flow conduits 103A and 103B are selected and appropriately mounted to inlet manifold 102 and outlet manifold 102' so as to have substantially the same mass distribution, moments of inertia, and elastic modules about bending axes W-W and W'-W' respectively. The flow conduits extend outwardly from the manifolds in an essentially parallel fashion.

Flow conduits 103A-B are driven by driver 104 in opposite directions about their respective bending axes W and W' and at what is termed the first out of bending mode of the flow meter. Driver 104 may comprise one of many well known arrangements, such as a magnet mounted to flow conduit 103A and an opposing coil mounted to flow conduit 103B. An alternating current is passed through the opposing coil to cause both conduits to oscillate. A suitable drive signal is applied by meter electronics 20, via lead 110 to driver 104. The description of FIG. 1 is provided merely as an example of the operation of a Coriolis flow meter and is not intended to limit the teaching of the present invention.

Meter electronics 20 transmits sensor signals on leads 111 and 111', respectively. Meter electronics 20 produces a drive signal on lead 110 which causes driver 104 to oscillate flow conduits 103A and 103B. Meter electronics 20 processes left and right velocity signals from pick-off sensors 105, 105' to compute mass flow rate. Path 26 provides an input and an output means that allows meter electronics 20 to interface with an operator.

Figure 2:
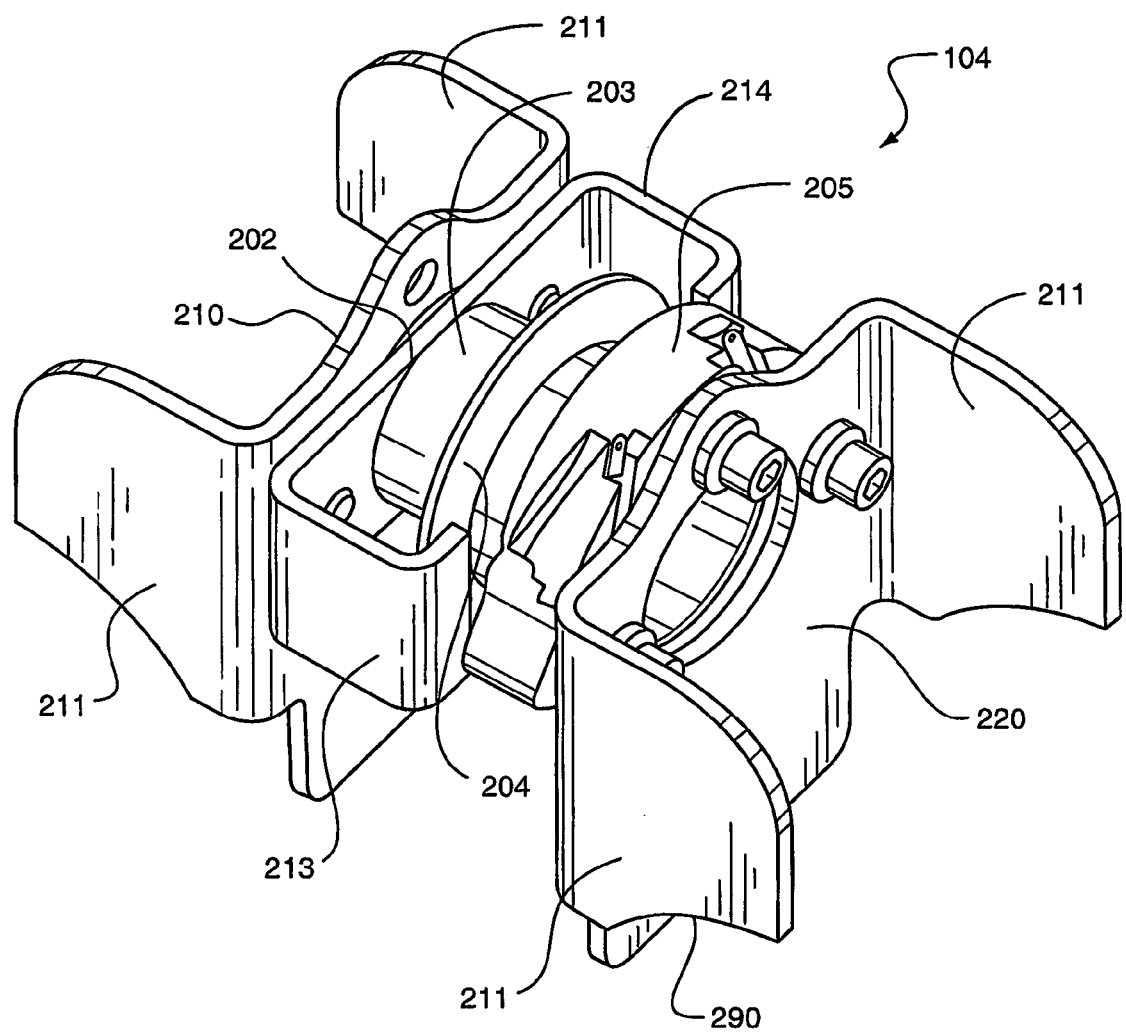
FIG. 2 illustrating a driver of a Coriolis flow meter.

FIG. 2 illustrates a drive system 104 for a preferred embodiment of Coriolis flow meter 5. In a preferred exemplary embodiment, driver 104 is a coil and magnet assembly. One skilled in the art will note that other types of drive systems may be used.

Driver 104 has a magnet assembly 210 and a coil assembly 220. Brackets 211 extend outward in opposing directions from magnet assembly 210 and coil assembly 220. Brackets 211 are wings which extend outward from the flat base and have a substantially curved edge 290 on a bottom side that is formed to receive a flow conduit 103A or 103B. The curved edge 290 of brackets 211 are then welded or in some other manner affixed to flow conduits 103A and 103B to attach driver 104 to Coriolis flow meter 5.

Magnet assembly 210 has a magnet keeper 202 as a base. Brackets 211 extend from a first side of magnet keeper 202. Walls 213 and 214 extend outward from outer edges of a second side of magnet keeper 202. Walls 213 and 214 control the direction of the magnetic field of magnet 203 perpendicular to the windings of coil 204.

Magnet 203 is a substantially cylindrical magnet having a first and a second end. Magnet 203 is fitted into a magnet sleeve (Not shown). The magnet sleeve and magnet 203 are affixed to a second surface of magnet keeper 202 to secure magnet 203 in magnet assembly 210. Magnet 203 typically has a pole (not shown) affixed to its second side. The magnet pole (not shown) is a cap that is fitted to the second end of magnet 203 to direct the magnetic fields into coil 204.

Coil assembly 220 includes coil 204, and coil bobbin 205. Coil bobbin 205 is affixed to a bracket 211. Coil bobbin 205 has a spool protruding from a first surface around which coil 204 is wound. Coil 204 is mounted on coil bobbin 205 opposing magnet 203. Coil 204 is connected to lead 110 which applies alternating currents to coil 204. The alternating currents cause coil 204 and magnet 203 to attract and repel one another which in turn causes flow conduits 103A and 103B to oscillate in opposition to one another.

Figure 3:
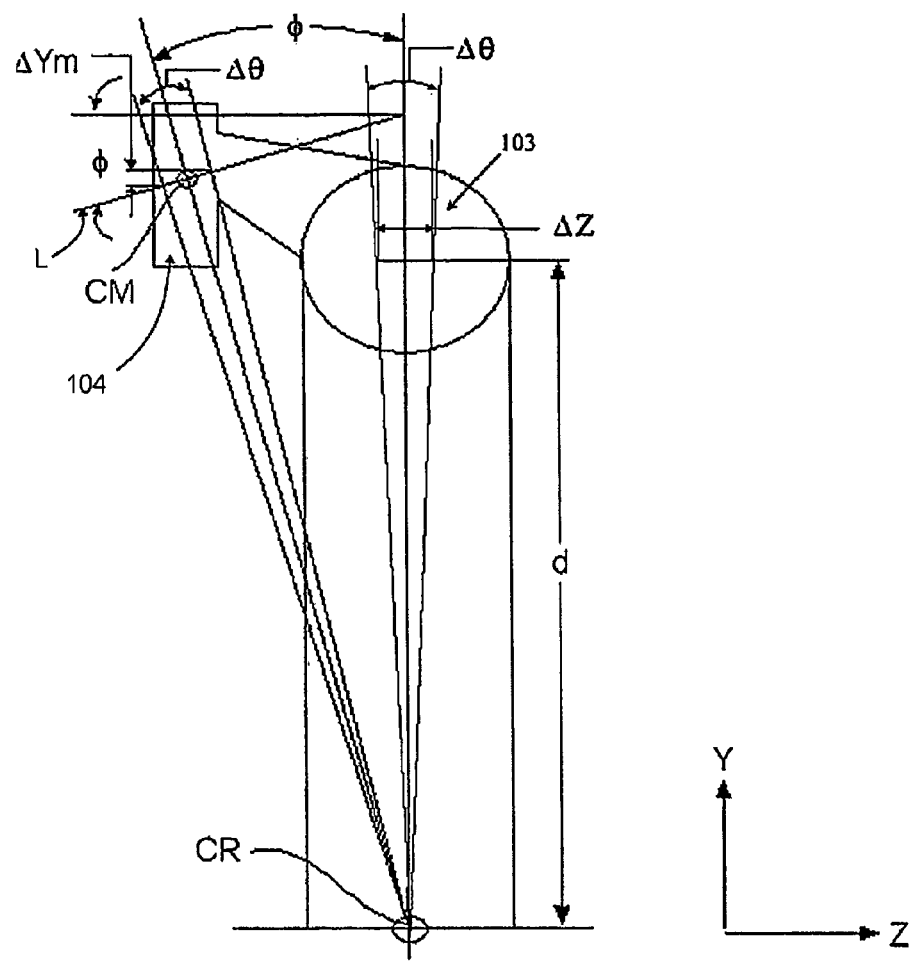
FIG. 3 illustrates an X-axis section view of a flow conduit of a Coriolis meter.

FIG. 3 illustrates a simplified X-axis section view of flow conduit 103. Flow conduit 103 has mounted to it driver 104. Driver 104 is offset from flow conduit 103 by $\phi$. Flow conduit 103 moves in the Z-direction with an amplitude $\Delta Z$. As flow conduit 103 translates in the Z-direction its fixed location causes it to rotate about its center of rotation, CR, resulting in angular amplitude, $\Delta\theta$. Driver 104 and its associated center of mass, CM, rotates with the same angular amplitude, $\Delta\theta$, as flow conduit 103. However, because of the offset angle, $\phi$, drive component center of mass CM oscillates up and down line L. This gives drive component center of mass CM vertical motion $\Delta Y_m$.

Figure 4:
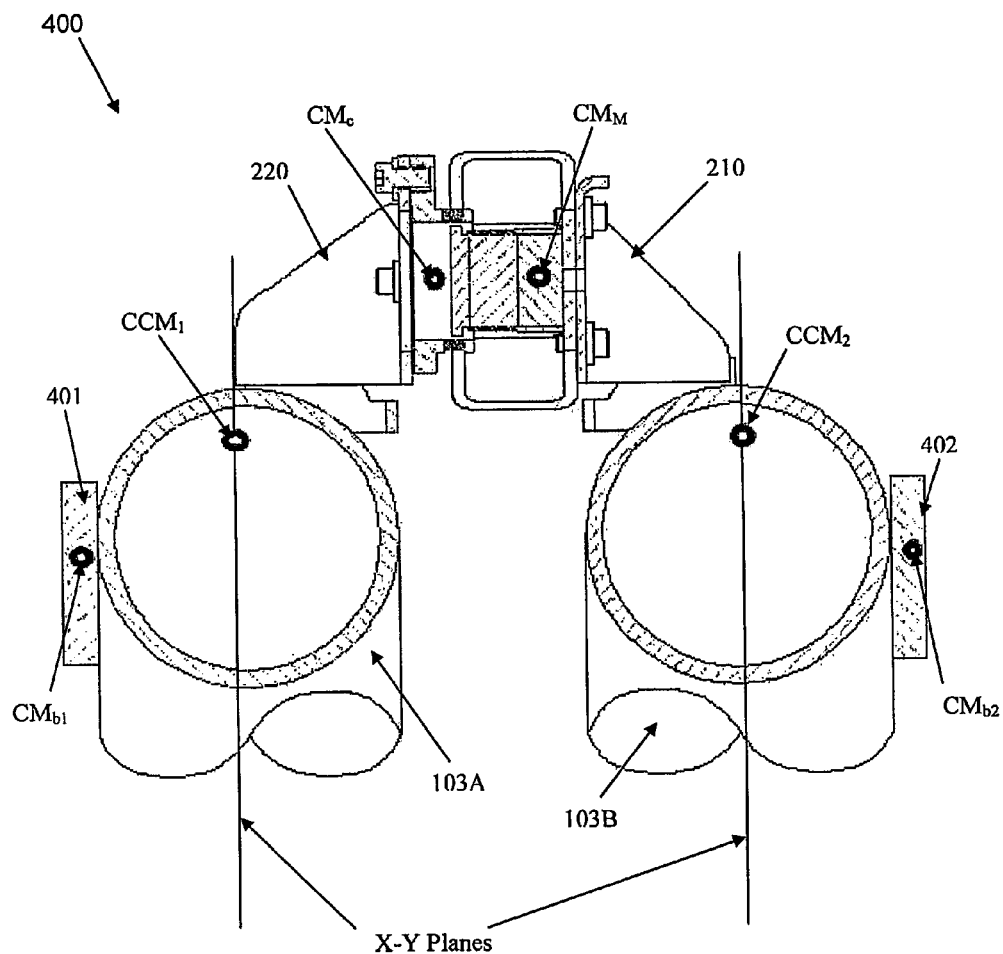
FIG. 4 illustrates a balance system in a first example of the invention.

FIG. 4 illustrates a balance system 400 in a first example of the invention. Balance system 400 includes balance weights 401 & 402 coupled to flow conduits 103A & B. Coupling of balance weights 401 & 402 can be accomplished using various methods including mechanical attachment, brazing or gluing. Balance weight 401 has a center of mass $CM_{b1}$. Balance weight 401 is sized and located such that its center of mass $CM_{b1}$ combined with the coil assembly center of mass $CM_c$, results in a combined center of mass $CCM_1$ that is located on the X-Y plane of conduit 103A. Also, balance weight 402 has a center of mass $CM_{b2}$. Balance weight 402 is sized and located such that its center of mass $CM_{b2}$ combined with the magnet assembly center of mass $CM_m$ results in a combined center of mass $CCM_2$ that is located on the X-Y plane of conduit 103B. The particular attributes of the balance weights are such that the mass times velocity of the balance weight is equal and opposite to the mass times velocity of the driver assembly, in the Y-direction, for each flow conduit as shown by:

$$(M^*V_Y)_{BW}+(M^*V_Y)_{DA}=0 \qquad (3)$$

In other words the momentum of the balance weight counters the momentum of the driver assembly attached to a particular conduit as given by:

$$(M_{BW})_Y+(M_{DA})_Y=0 \qquad (4)$$

Figure 5:
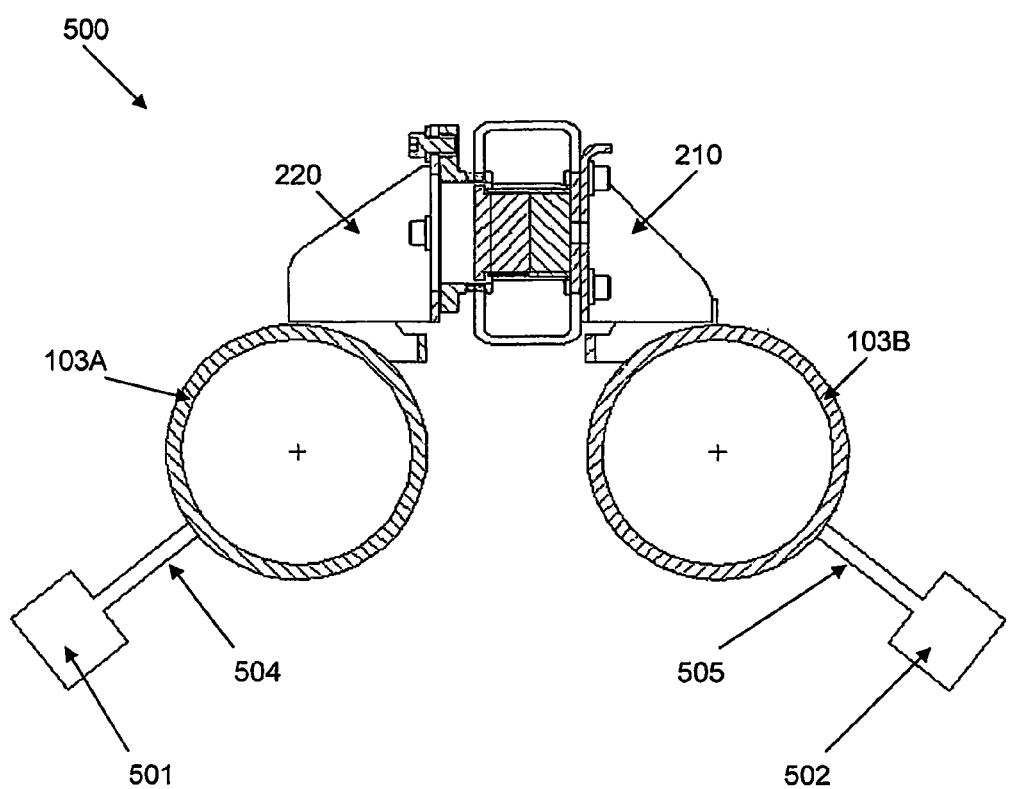
FIG. 5 illustrates a balance system in another example of the invention.

FIG. 5 illustrates balance system 500 in another example of the invention. Balance system 500 includes balance weights 501 & 502 coupled to flow conduits 103A & B using leaf springs 504 & 505. Leaf spring 504 is oriented at approximately 45 degrees to the X-Y plane and is connected to the opposite side of the flow conduit as coil assembly 220. The stiffness of leaf spring 504 and mass of balance weight 501 are chosen so that the natural frequency of the active-y-balance in its first vibration mode (the diving board mode) is below the drive frequency of the meter. With the natural frequency below the excitation (drive) frequency, weight 501 tends to move out of phase with conduit 103A. Thus, as conduit 103A moves to the left (−Z direction), active-y-balance weight 501 moves to the right (+Z) relative to the conduit. But, because of the angle of leaf spring 504 to the X-Y plane, weight 501 is constrained by leaf spring 504 to move to the right and down (+Z and −Y). This is advantageous because when conduit 103A moves to the left, the offset coil assembly 220 moves left and up (+Z and +Y). By designing mass and spring rate such that the Y-direction momentum (mass times velocity) of the active-y-balance are equal and opposite to the Y-direction momentum of the offset driver components, the external Y-direction vibration of the entire meter can be nearly eliminated. The same design principles apply to tube 103B.

This second example has an additional advantage. Because weight 501 and 502 are suspended from conduits 103A & B by leaf spring 504 & 505, they vibrate out of phase with flow conduits 103A & B, resulting in very little of its mass being coupled to flow conduits 103A & B.

The above examples are not limited to compensating for the driver mass offset. For instance, deformation of the manifold castings by conduit forces can cause the meter flanges to vibrate in the Y-direction. If this flange vibration is in-phase with that caused by the drive mass offset, then the balance mass can be increased to compensate for the additional vibration due to the manifold deformation. Likewise, if the flange vibration due to manifold deformation is out-of-phase with that caused by the drive mass offset, the balance mass can be made smaller.

What is claimed is:

1. A Coriolis flow meter comprising:
    at least one flow conduit;
    a drive system coupled to the at least one flow conduit;
    a balance system coupled to the at least one flow conduit;
        wherein the balance system is sized and located such that the momentum of the balance system is equal and opposite to the momentum of the drive system.

2. The Coriolis flow meter of claim 1 wherein the balance system comprises a balance mass.

3. The Coriolis flow meter of claim 1 wherein the balance system is sized and located such that the combined center of mass of the drive system and the balance system lies proximate a plane of the centerline of the at least one flow conduit.

4. The Coriolis flow meter of claim 1 wherein the balance system comprises a balance mass coupled to the at least one flow conduit using a leaf spring.

5. The Coriolis flow meter of claim 4 wherein the leaf spring stiffness and the balance mass cause the natural frequency of the balance system to be less than the drive frequency of the flow meter.

6. The Coriolis flow meter of claim 1 wherein the balance system vibrates out of phase with the at least one flow conduit.

7. The Coriolis flow meter of claim 1 wherein the balance system is located on the opposite side of the at least one flow conduit from the drive component and at an orientation substantially forty-five degrees to a plane of the flow conduit.

8. The Coriolis flow meter of claim 1 wherein the balance system is located on the opposite side of the at least one flow conduit from the drive component.

9. The Coriolis flow meter of claim 1 wherein the balance system is sized and located such that the momentum of the balance system is equal and opposite to the momentum of the drive system in a direction perpendicular to a drive motion.

10. A method for force balancing a Coriolis flow meter having at least one flow conduit, the method comprising the steps of:
    coupling a drive system to the at least one flow conduit;
    coupling a balance system to the at least one flow conduit; and
    locating and sizing the balance system such that the momentum of the balance system is equal and opposite to the momentum of the drive system.

11. The method of claim 10 including the step of forming the balance system using a balance mass.

12. The method of claim 10 further comprising the steps of locating and sizing the balance system such that the combined center of mass of the drive system and the balance system lies proximate a plane of the centerline of the at least one flow conduit.

13. The method of claim 10 wherein the step of coupling a balance system to at least one flow conduit comprises the steps of coupling a balance mass to at least one flow conduit using a leaf spring.

14. The method of claim 13 including the step of choosing the leaf spring stiffness and the balance mass such that the natural frequency of the balance system is below the drive frequency of the flow meter.

15. The method of claim 10 including the step of vibrating the balance system out of phase with the at least one flow conduit.

16. The method of claim 10 wherein the step of locating the balance system comprises the steps of:
    locating the balance system on the opposite side of the at least one flow conduit from the drive system; and
    orientating the balance system substantially forty-five degrees to a plane of the flow conduit.

17. The method of claim 10 including the step of locating the balance system on the opposite side of the at least one flow conduit from the drive system.

18. The method of claim 10 wherein step of locating and sizing the balance system comprises the steps of locating and sizing the balance system such that the momentum of the balance system is equal and opposite to the momentum of the drive system in a direction perpendicular to a drive motion.

* * * * *